G. STRICKER.
Vehicle-Spring.
No. 199,329. Patented Jan. 15, 1878.
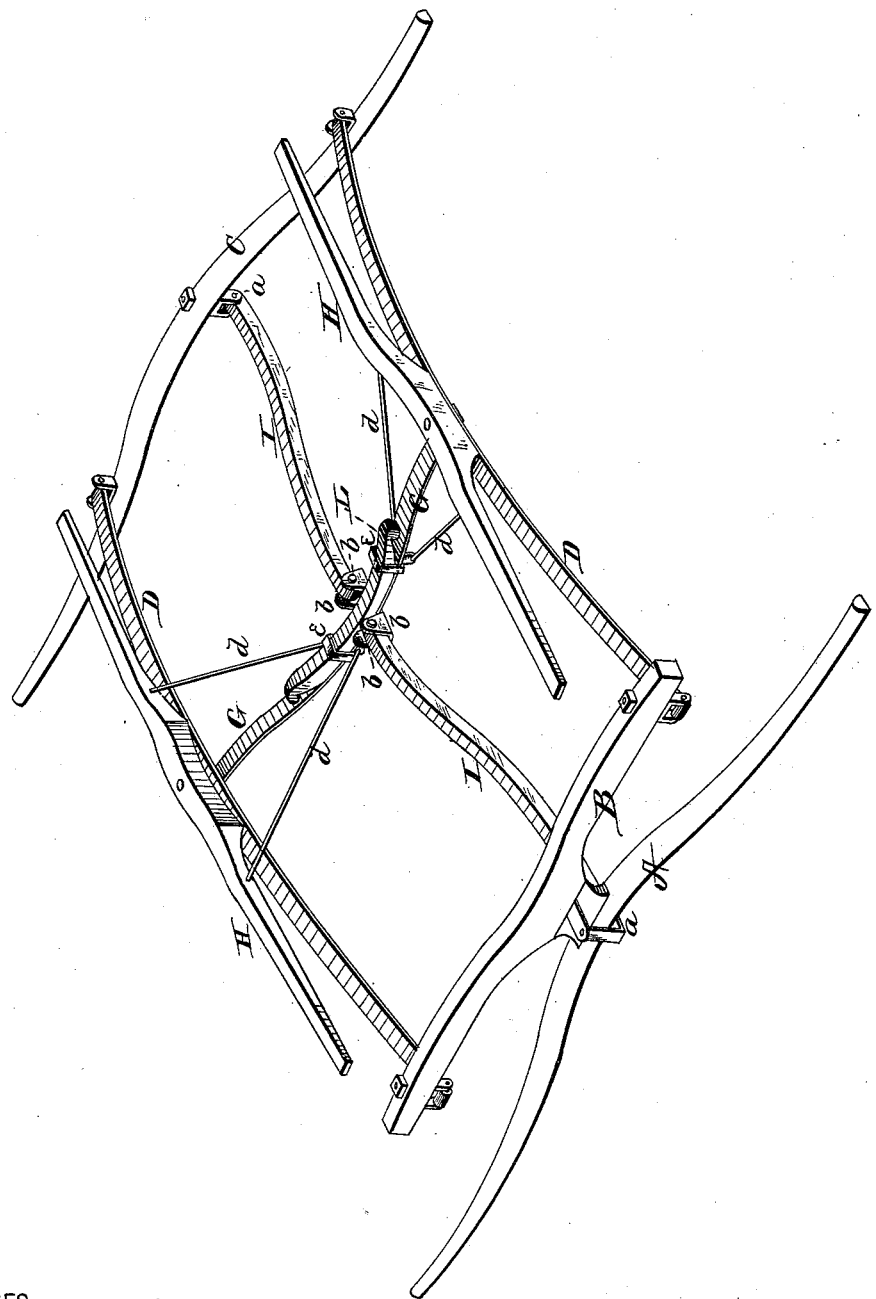

UNITED STATES PATENT OFFICE.

GEORGE STRICKER, OF CATAWISSA, PENNSYLVANIA.

IMPROVEMENT IN VEHICLE-SPRINGS.

Specification forming part of Letters Patent No. 199,329, dated January 15, 1878; application filed November 21, 1877.

*To all whom it may concern:*

Be it known that I, GEO. STRICKER, of Catawissa, in the county of Columbia, and in the State of Pennsylvania, have invented certain new and useful Improvements in Vehicles; and do hereby declare that the following is a full, clear, and exact description thereof, reference being had to the accompanying drawing, and to the letters of reference marked thereon, making a part of this specification.

My invention relates to running-gears for vehicles; and it consists in a divided center perch, pivoted in the center to a brace connecting the side springs; and in the construction and combination of parts, as will be hereinafter more fully set forth.

In order to enable others skilled in the art to which my invention appertains to make and use the same, I will now proceed to describe its construction and operation, referring to the annexed drawing, which represents a perspective view of my invention.

A represents the front axle, with head-block B, and C the hind axle. D D are the side springs, connected to the front head-block and rear axle in any suitable and convenient manner.

The perch in this running-gear is arranged in the center, and made in two parts, I I. The outer ends of these parts are pivoted in clips *a a* below the front and rear axles, while their inner ends are separately pivoted between ears *b b* in the center of a brace, G, the ends of which are secured to the side springs D D, at or near the center thereof.

On top of the side springs D D are secured bars H H, for supporting the body of the vehicle. These bars H are, by stays *d d*, connected to the cross-brace G, said stays running from certain points on the bars H at equal distances from the center to the brace G.

The perch I I being made in two parts, and pivoted, as described, at both ends of each part, and the two parts of the perch curved, as shown, it is clear that they will give to the weight in the body or box of the vehicle, and in a measure separate the axles more or less, and thus entirely prevent any breakage that might be caused by the jar and concussion in going into ruts, &c.

The stays *d d* may be connected to the springs D as well as to the bars H—for instance, by connecting them to the clips that secure said bars to the springs, or in any other suitable manner. These braces or stays prevent any twisting motion of the running-gear.

If desired, I may place a bar, L, along the center of the brace G, and connect the same to the brace by clips *e*, in which case the inner ends of the stays *d* may be connected to said clips.

I am aware that it is not new to have a central rocking shaft with center and end cranks connecting with a center bar extending in one direction, and side bars extending in opposite directions and hence I do not claim such as my invention.

Having thus fully described my invention, what I claim as new, and desire to secure by Letters Patent, is—

1. In a vehicle having side springs D D, connecting the rear axle and front head-block, a single center perch, I I, divided in the center, and having the outer ends connected to the front and rear axles and the inner ends pivoted to a cross-brace, G, having its ends rigidly connected to the side springs, substantially as herein set forth.

2. In combination with the divided perch I I, cross-brace G, and side springs D D, with bars H H, the stays *d d*, arranged substantially as and for the purposes herein set forth.

In testimony that I claim the foregoing I have hereunto set my hand this 21st day of November, 1877.

GEORGE STRICKER.

Witnesses:
FRANK GALT,
H. AUBREY TOULMIN.